Patented Apr. 7, 1936

2,036,940

UNITED STATES PATENT OFFICE 2,036,940

MANUFACTURE OF A SOLVENT FROM GLYCEROL

Eric Leighton Holmes, Teddington, England

No Drawing. Application October 27, 1934, Serial No. 750,384. In Great Britain November 10, 1933

5 Claims. (Cl. 260—134)

This invention consists in the manufacture of a liquid consisting chiefly of acetol and of value as a solvent for cellulose derivatives, by subjecting liquid glycerol to the action of a dehydrogenating catalyst containing copper and heated to a temperature between 200 and 300° C., and collecting the liquid produced by condensing the vapours evolved. By fractional distillation this mixture yields a fraction which boils at 140–150° C. and when re-distilled gives substantially pure acetol, which differs from the acetol hitherto known in that it does not readily polymerize on standing.

The following examples illustrate the invention:

Example 1.—125 grams of glycerol at room temperature are dropped on to 20 cc. of copper chromite catalyst (which may be made as described by Adkins & Conner in Journal of the American Chemical Society 1931, 53, page 1091–5), contained in a glass tube of 2.5 cm. diameter heated to 240–260° C., at a rate of 1 drop per second. The vapours leaving the tube are passed into a condenser whereby 115 grams of a light-brown limpid liquid are obtained. When this is fractionally distilled under atmospheric pressure the chief fraction (41 grams) boils at 140–150° C. By redistilling this fraction substantially pure acetol, boiling at 144–146° C., is obtained.

Example 2.—100 grams of glycerol are dropped, at the rate of 1 drop per 3 seconds, on to 60 cc. of copper oxide wire which has been reduced by heating it in a stream of hydrogen and is at a temperature of 240–260° C.; the product is worked up as described in Example 1, but the yield is considerably less than in that example.

Having thus fully described the nature of my said invention and the best means I know of carrying out the same, I declare that what I claim is:—

1. A manufacture of a liquid solvent, wherein glycerol is subjected to the action of a dehydrogenating catalyst containing copper and heated to 240–260° C.

2. A manufacture of a solvent which consists in subjecting glycerol to the action of a dehydrogenating catalyst containing copper and heated to 240–260° C. and condensing to a liquid the vapours thus produced.

3. A manufacture of acetol wherein glycerol is subjected to the action of a dehydrogenating catalyst containing copper and heated to 240–260° C., the vapours thus produced are condensed to a liquid and this liquid is fractionally distilled to obtain a fraction that boils at 140–150° C., which is redistilled.

4. In the manufacture of a solvent, the steps of subjecting liquid glycerol to the action of a copper chromite catalyst heated to 240–260° C., and condensing the vapors thus produced.

5. In the manufacture of acetol, the steps of subjecting liquid glycerol to the action of a copper chromite catalyst heated to 240–260° C., condensing to a liquid the vapors thus produced, fractionally distilling said liquid to obtain a fraction that boils at 140–150° C., and then redistilling said fraction.

ERIC LEIGHTON HOLMES.